(12) United States Patent
Trefz

(10) Patent No.: US 6,644,002 B2
(45) Date of Patent: Nov. 11, 2003

(54) WALK-BEHIND SELF-PROPELLED POWER EQUIPMENT UNIT WITH SPEED CONTROL

(75) Inventor: Harlin J. Trefz, Jackson, TN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/964,236

(22) Filed: Sep. 25, 2001

(65) Prior Publication Data

US 2003/0056481 A1 Mar. 27, 2003

(51) Int. Cl.$^7$ ................................................ A01D 69/00
(52) U.S. Cl. ........................... 56/10.8; 56/DIG. 18
(58) Field of Search ..................... 56/10.26, 10.8, 56/11.1, 11.6, DIG. 18, DIG. 3; 172/42, 329, 351, 361

(56) References Cited

U.S. PATENT DOCUMENTS

| | | | |
|---|---|---|---|
| 3,079,743 A | 3/1963 | Egley | |
| 4,295,326 A | 10/1981 | Green | 56/11.3 |
| 4,558,558 A | 12/1985 | Horner, Jr. et al. | 56/11.3 |
| 4,704,847 A | 11/1987 | Greider et al. | 56/10.5 |
| 4,878,339 A | 11/1989 | Marier et al. | 56/14.7 |
| 5,138,824 A | 8/1992 | Oshima et al. | 56/10.2 |
| 5,146,735 A | 9/1992 | McDonner | 56/11.3 |
| 5,155,985 A | 10/1992 | Oshima et al. | 56/10.8 |
| 5,203,147 A | 4/1993 | Long | 56/10.1 |
| 5,251,711 A | 10/1993 | Meyer et al. | 180/19.1 |
| 5,261,214 A | 11/1993 | Wollersheim | 56/11.3 |
| 5,307,612 A | 5/1994 | Tomiyama et al. | 56/11.1 |
| 5,343,678 A | 9/1994 | Stuart | 56/11.3 |
| 5,375,674 A | 12/1994 | Peter | 180/19.3 |
| 5,488,818 A | * 2/1996 | Powers et al. | 56/11.4 |
| 5,511,367 A | 4/1996 | Powers et al. | 56/11.2 |
| 5,542,241 A | 8/1996 | Lydy et al. | 56/11.3 |
| 5,692,366 A | * 12/1997 | Hardesty | 56/11.2 |
| 5,701,967 A | 12/1997 | Barnard | 180/19.3 |
| 5,803,847 A | 9/1998 | Kamm | 474/37 |
| 5,809,755 A | * 9/1998 | Velke et al. | 56/10.8 |
| 6,082,083 A | 7/2000 | Stalpes et al. | 56/11.6 |
| 6,098,385 A | * 8/2000 | Turk | 56/11.3 |

FOREIGN PATENT DOCUMENTS

EP    0903073 A1    3/1999

* cited by examiner

*Primary Examiner*—Robert E. Pezzuto
*Assistant Examiner*—Meredith Petravick
(74) *Attorney, Agent, or Firm*—Harrington & Smith, LLP

(57) ABSTRACT

A self-propelled power equipment unit having a frame with a handle having a general U-shaped rear end; a drive located on the frame and connected to a drive wheel by a transmission; and a user actuated control connected to the transmission. The user actuated control comprises a speed control lever pivotably connected to the handle proximate the U-shaped rear end and an operator presence lever pivotably connected to the speed control lever.

26 Claims, 11 Drawing Sheets

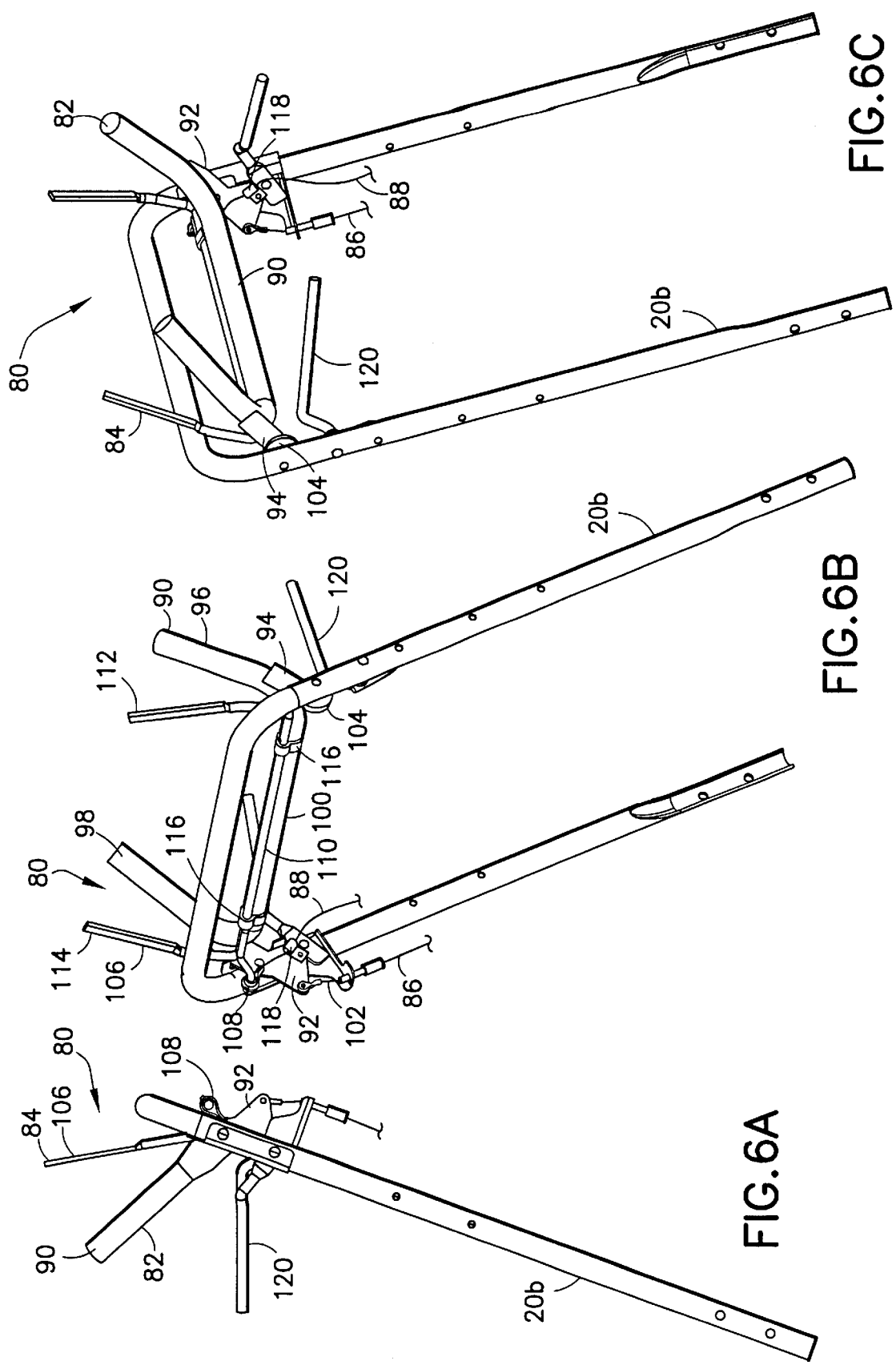

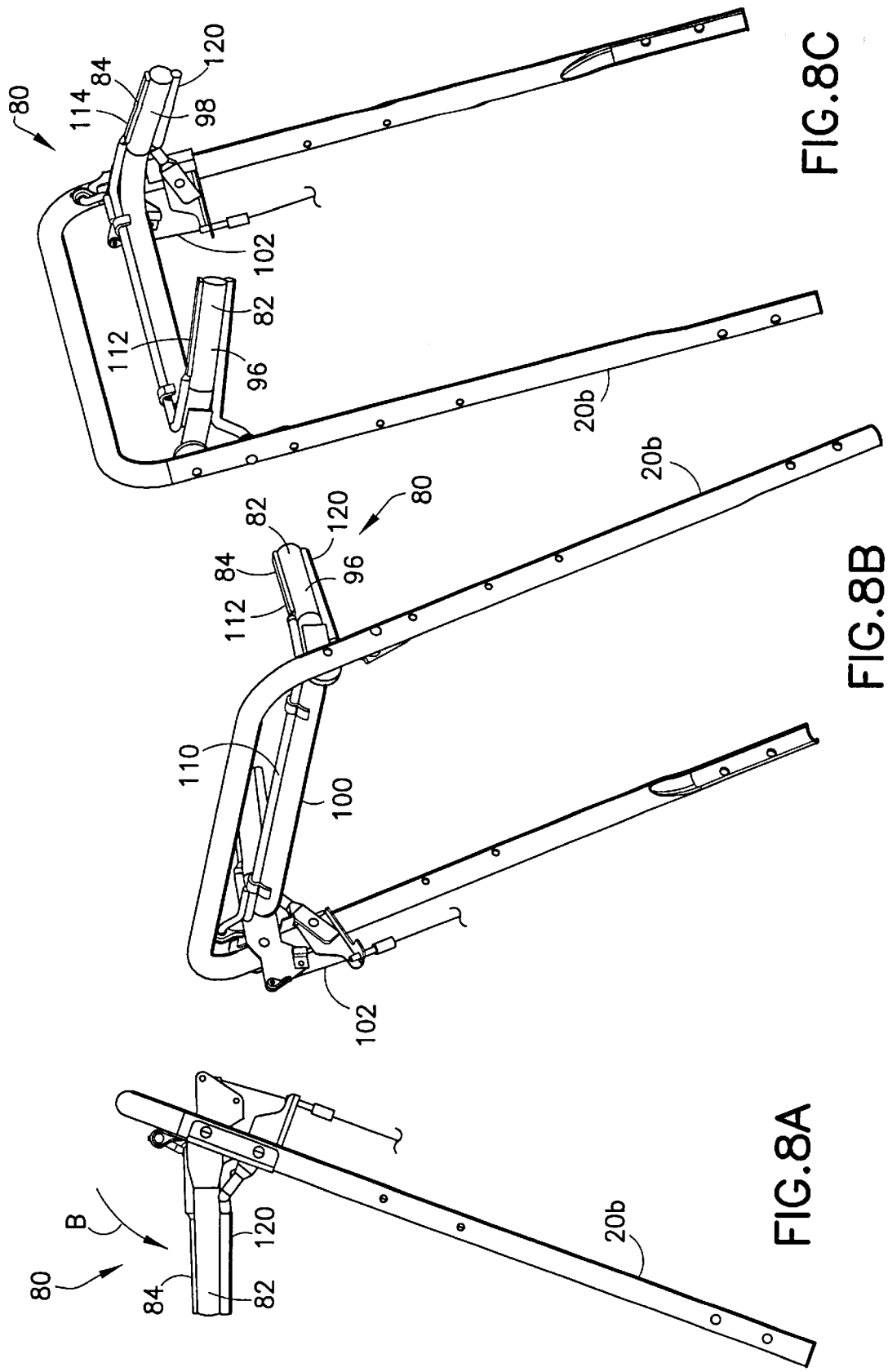

WALK-BEHIND SELF-PROPELLED POWER EQUIPMENT UNIT WITH SPEED CONTROL

BACKGROUND OF THE INVENTION

1. Field of the Invention

The present invention relates to power equipment and, more particularly, to a speed control for a walk-behind self-propelled power equipment unit.

2. Prior Art

There is a desire to provide a speed control device for a walk-behind self-propelled power equipment unit, such as a lawnmower, which works by an operator pushing against a handle of the unit and walking at his or her individual speed. A traction drive is proportionally engaged for moving the unit based upon how fast the user walks. U.S. Pat. No. 4,558,558 discloses a lawnmower traction control system having a rotatable control bar mounted on a handle. The control bar is pivotably mounted to the handle along two orthogonal axes of rotation. U.S. Pat. No. 6,082,083 discloses a ground speed control system with a rotatable operator release engine control bail which is pivotably connected to a sliding handle grip. However, this type of control is sensitive to ground speed variations when operated on rough ground and, when turning, it is awkward to control speed of the unit. There is a desire to provide an improved speed control system for easier turning. There is also a desire to provide an improved speed control system which provides greater stability and control on rough ground.

SUMMARY OF THE INVENTION

In accordance with one embodiment of the present invention, a self-propelled power equipment unit is provided comprising a frame comprising a handle with a general U-shaped rear end; a drive located on the frame and connected to a drive wheel by a transmission; and a user actuated control connected to the transmission. The user actuated control comprises a speed control lever pivotably connected to the handle proximate the U-shaped rear end and an operator presence lever pivotably connected to the speed control lever.

In accordance with another embodiment of the present invention, a walk-behind self-propelled lawnmower is provided comprising a frame comprising a handle; a motor located on the frame; wheels connected to the frame; a transmission connecting the motor to one of the wheels; and a user actuated control comprising a speed control lever and a control link connected between the speed control lever and the transmission. The speed control lever has a general U-shape with opposite side ends of the general U-shape each being pivotably connected to respective opposite sides of the handle. The control link is pulled by the speed control lever as a top of the lever is pivoted forward on the handle.

In accordance with one method of the present invention, a method of assembling a user actuated control for a walk-behind self propelled lawnmower is provided comprising steps of providing a lawnmower handle; pivotably connecting a user actuated control to the handle, the user actuated control having a general U-shaped section with opposite ends of the U-shaped section being directly pivotably attached to respective opposite sides of the handle; and connecting a link between the user actuated control and a drive transmission of the mower. The link is connected to the user actuated control such that the link is pulled by the user actuated control when a top end of the user actuated control is pivoted forward on the handle.

BRIEF DESCRIPTION OF THE DRAWINGS

The foregoing aspects and other features of the present invention are explained in the following description, taken in connection with the accompanying drawings, wherein:

FIGS. 6A–6C are side elevational and perspective views of a portion of a handle and an alternate embodiment of a control system incorporating features of the present invention at a first deactuated or OFF position;

FIGS. 8A–8C are side elevational and perspective views of the handle and control system shown in FIGS. 6A–6C at a second actuated or ON position;

DETAILED DESCRIPTION OF THE PREFERRED EMBODIMENT

Figure 1:
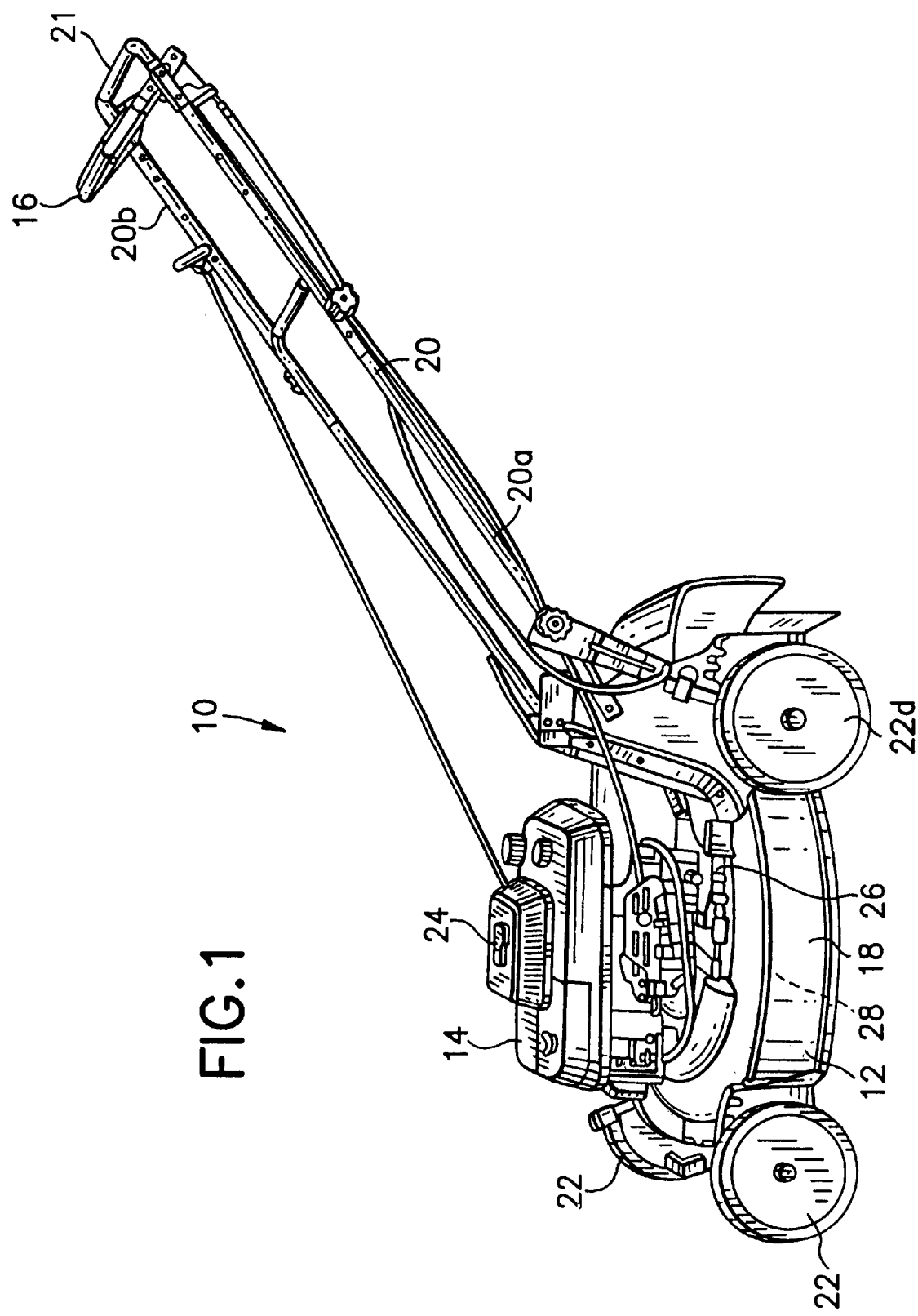
FIG. 1 is a perspective view of a lawnmower having a control system incorporating features of the present invention.

Referring to FIG. 1, there is shown a perspective view of a lawn mower 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The lawnmower 10 generally comprises a frame 12, a drive 14, and a user actuated control 16. Although the present invention will be described with reference to a lawnmower, the present invention could be incorporated into any suitable type of walk-behind self-propelled power equipment. For example, the present invention could be used in a snow blower, a garden tiller, or any other suitable type of propelled or motorized power equipment unit. In this embodiment, the frame 12 generally comprises a deck 18 and a handle 20. Wheels 22 are connected to the deck 18. The handle 20 extends upward and rearward from the deck 18. In a preferred embodiment, the handle 20 is adjustably mounted to the deck 18. The handle 20 has two U-shaped members 20a, 20b connected in series to form a rigid handle structure. This rigid handle structure can be stationarily fixed to the deck 18 or, could be slightly movably mounted to the deck 18. In alternate embodiments, any suitable type, shape or size of handle could be provided. The lawnmower 10 could also comprise a grass clippings catcher bag attached to the handle 20 and attached to an output from the deck 18.

The drive 14 comprises a motor 24 and a drive wheel transmission 26. In this embodiment, the motor 24 is provided as an internal combustion engine. However, the motor could comprise any suitable type of motor, such as an electric motor. The motor 24 has an output shaft which is connected to a cutting blade 28. The cutting blade 28 is located under the deck 18. The drive wheel transmission 26 is also connected to the motor 24. The transmission 26 is connected between the motor 24 and at least one drive wheel 22d. Many different types of transmissions are known in the art. Any suitable type of transmission between the motor and a drive wheel could be provided.

Figure 2B:
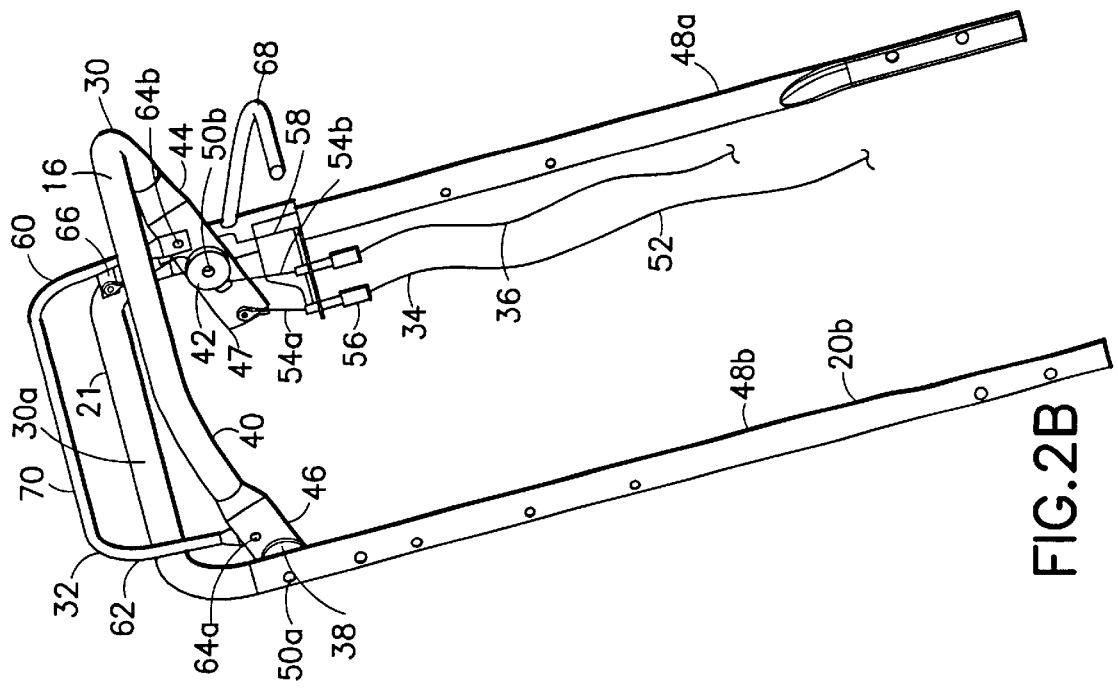
FIG. 2B is a perspective view of the control system and handle shown in FIG. 2A.
Figure 2A:
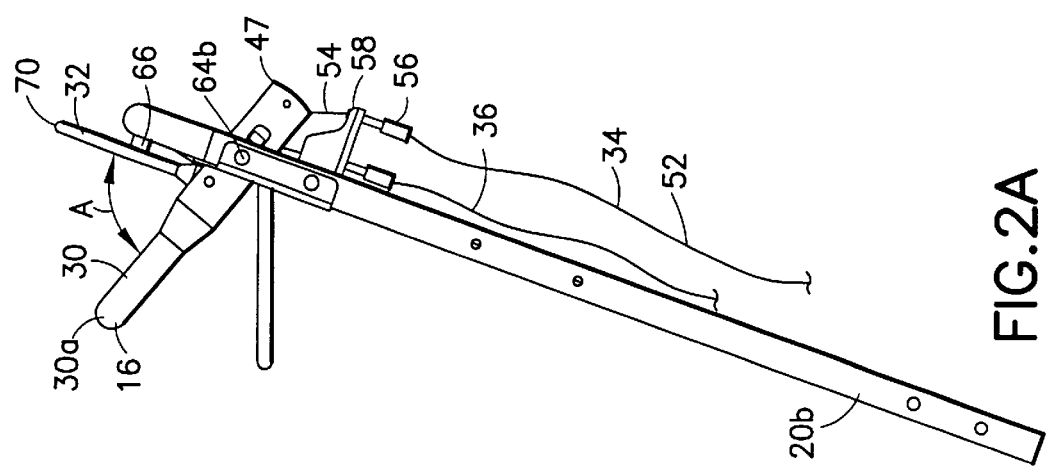
FIG. 2A is a side elevational view of the control system and a portion of the handle is shown in FIG. 1 at a first deactuated or OFF position.

The user actuated control 16 is connected to the top rear end of the handle 20. Referring also to FIGS. 2A and 2B, the top handle member 20b is shown with the user actuated control 16 at a deactivated or OFF position. In this embodiment, the user actuated control 16 generally comprises a speed control member 30, an operator presence member 32, a first link 34, a second link 36, and a movement resistance system 38. However, in alternate embodiments, the user actuated control could be comprised of alternative or additional elements. The speed control member of 30 generally comprises a U-shaped member 40 and a guide 42. The U-shaped member 40 is a lever or bail which has two legs 44, 46. The two legs 44, 46 are pivotably attached to opposite sides 48a, 48b of the handle member 20b. In this embodiment the first leg 44 is longer than the second leg 46. An end 47 of the first leg 44 extends beyond the pivot point mounting of the first leg 44 to the side 48a of the handle. The U-shaped member 40, thus, forms a lever. In alternate embodiments the member 40 could have a loop shape, one or two L shapes, one or two C shapes, or a ring shape (perhaps with spaced ends). However, in alternate embodiments, the speed control member 30 could be comprised of any suitable size, shape or type of member(s). The speed control member could also be movably attached to the handle in any suitable manner.

The movement resistance system 38, in this embodiment, comprises a friction pack. The friction pack 38 is sandwiched between the second leg 46 and the side 48b of the handle. In this embodiment, the friction pack 38 is mounted on the pivot 50a which connects the leg 46 to the side 48b. The friction pack 38 provides an increased frictional resistance to movement of the speed control member relative to the handle. This increase in resistance to movement of the speed control member 30 relative to the handle has been found beneficial in a ground traversing unit, such as the lawnmower 10, because of problems encountered with terrain variations or bumpy ground, such as small holes and bumps which the lawnmower can encounter. Without the friction pack 38, a jolt of the handle 20, when the lawnmower 10 encounters bumpy or rough ground, might cause the speed control lever 32 to unintentionally move a relatively large amount. The provision of the friction pack 38 helps to significantly reduce this unintentional movement. Therefore, unintentional variations in the speed of the lawnmower 10 along the terrain can be reduced. In alternate embodiments, any suitable type of movement resistance system could be provided. In addition, the movement resistance system could be connected between the speed control member and the handle in any suitable fashion. In another alternate embodiment, the movement resistance system might not be provided.

The opposite leg 44 of the U-shaped member 40 is pivotably connected to the side 48a of the handle by the pivot 50b. In this embodiment, the guide 42 is attached to the U-shaped member 40 and handle member 20b by the pivot 50b. The guide 42 has a general wheel shape. The outer perimeter of the guide 42 has a groove extending therein along the circumference of the guide. However, in an alternate embodiment, any suitable guide could be provided. Alternatively, the guide 42 might not be provided. The wire 54b could be wrapped around the guide 42, and the guide 42 could be rotatable.

The first and second links 34, 36 are substantially the same. Each link has an outer sheath 52, an inner wire or cable 54 surrounded by the sheath, and mounts 56. The mounts 56 are stationarily attached to both front and rear ends of the outer sheaths 52. The inner wires 54 are longitudinally slideable inside the outer sheaths 52 and mounts 56. The mounts 56 at the rear end of the links 34, 36 are stationarily attached to a bracket 58. In the embodiment shown, the bracket 58 also comprises a grab handle 68. The grab handle 68 has a general L shape and extends in a forward direction. However, in an alternate embodiment, any suitable type of grab handle and system for mounting the grab handle to the handle 20 could be provided. Alternatively, the handle 20 might not comprise a grab handle. A rear end of the inner wire 54a of the first link 34 is connected to the end 47 of the U-shaped member's first leg 44. The front end of the inner wire 54a is connected to the transmission 26, such as a pulley which can be moved to increase or decrease tension of a drive belt between the motor 24 and the drive wheel 22d.

Figure 4B:
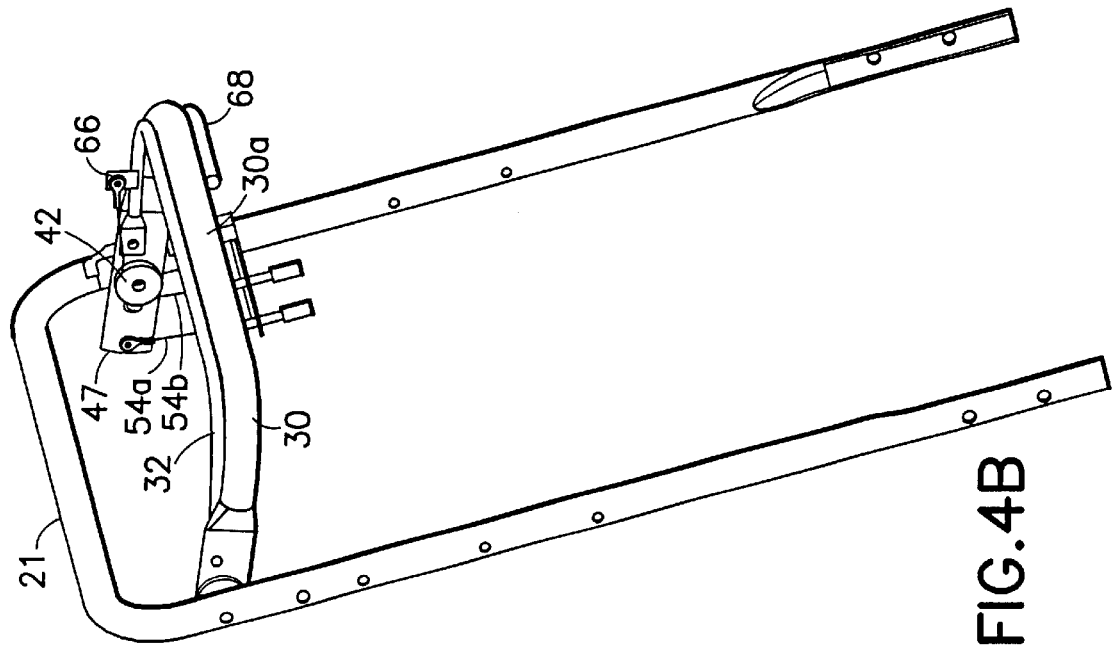
FIG. 4B is a perspective view of the control system and handle shown in FIG. 4A.
Figure 4A:
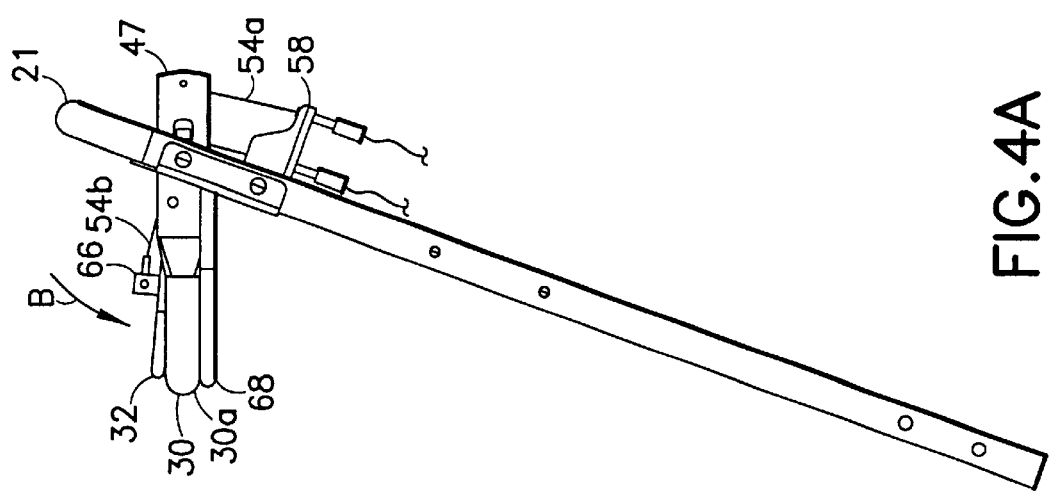
FIG. 4A is a side elevational view of the control system and handle shown in FIG. 2A at a second actuated or ON position.

A rear end of the inner wire 54b of the second link 36 is connected to the operator presence member 32 (see FIGS. 4A and 4B). The rear end of the wire 54b extends from its mount 56 along the bottom and rear side of the groove in the guide 42. The wire 54b is connected to an operator presence system at the motor 24, such as a brake which can apply a braking force to a flywheel of the engine. The front end of the inner wire 54b is connected to a brake for stopping the flywheel or the engine 24. The front end of the inner wire 54b can be connected to an engine kill switch or to a system for disengaging the cutting blade 28 from being rotated by the motor 24. In alternate embodiments, any suitable size, shape or type of links could be provided. When the operator presence lever 32 is in its OFF position, the operator presence system is in an OFF position; preventing the lawnmower from cutting grass or operating.

The operator presence member 32 is movably connected to the speed control member 30. In this embodiment, the operator presence member 32 is a lever or bail and comprises a one-piece general U-shaped member. However, in an alternate embodiment, the operator presence member 32 could have any suitable size or shape, or could be comprised of more than one member. The operator presence member 32 has legs 60, 62 which are pivotably connected to the U-shaped member 40 by pivots 64a, 64b. However, in alternate embodiments, the operator presence member 32 could be movably mounted to the speed control member 30 in any suitable manner. The end of the wire 54b is connected to the leg 60 by a mount 66.

As noted above, in FIGS. 2A and 2B the user actuated control 16 at a deactuated or OFF position. In this deactuated position the speed control member 30 has its front center section 30a at an upward position and the end 47 of the leg 44 at a downward position. The front center section 30a also projects in a forward direction. The wire 54a is in tension, such as by being pulled by a spring attached to the transmission 26. Thus, the wire 54a pulls on the end 47. However, the force exerted by the wire 54a against the end 47 is preferably not sufficient to move the speed control member 30 due to the frictional forces exerted by the friction pack 38. In a preferred embodiment, the speed control member 30 must be manually moved by a user in order for the wire 54a to be moved.

Also in this deactuated position, the operator presence member 32 has center section 70 located in an upward position. However, the center section 70 is spaced apart from the center section 30a. This is because the operator presence member 32 is offset by an angle A as seen in FIG. 2A. The angle A is about 70 degrees. However, any suitable angle could be provided. The wire 54b is in tension, such as by being pulled by a spring at the motor. The force exerted by the wire 54b against the operator presence member 32 is sufficient to my bias the operator presence member 32 in its deactuated position shown. In order to move the operator presence member 32 from its deactuated position, the user must use sufficient force to overcome the force exerted by the spring loaded wire 54b. In alternate embodiments, any suitable type of system could be used to bias the operator presence member 32 at its deactuated position.

Figure 3B:
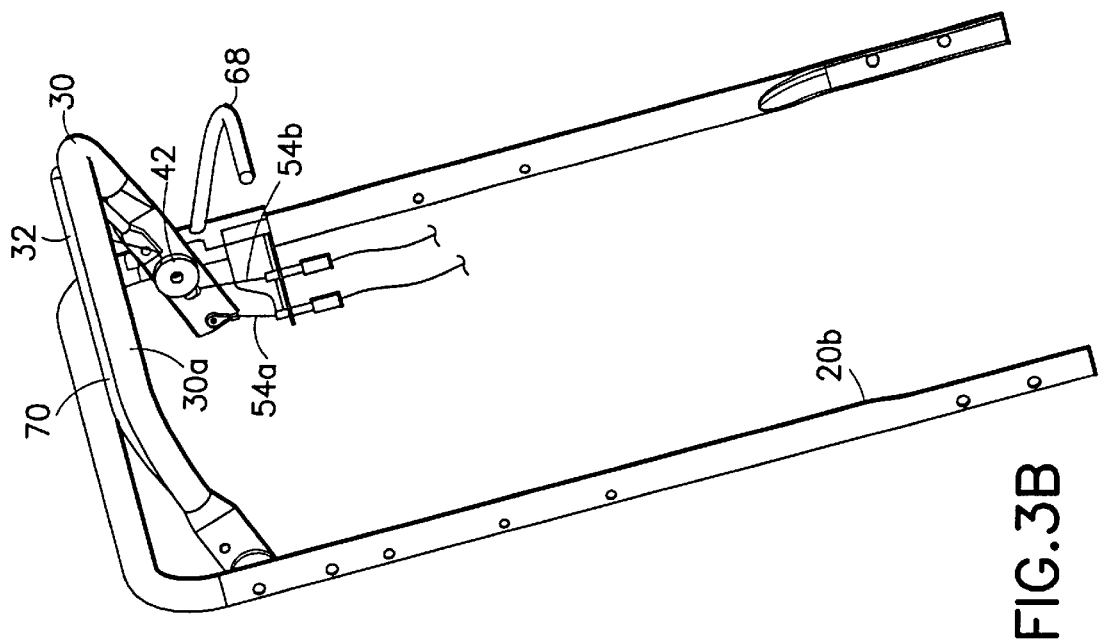
FIG. 3B is a perspective view of the control system and handle shown in FIG. 3A.
Figure 3A:
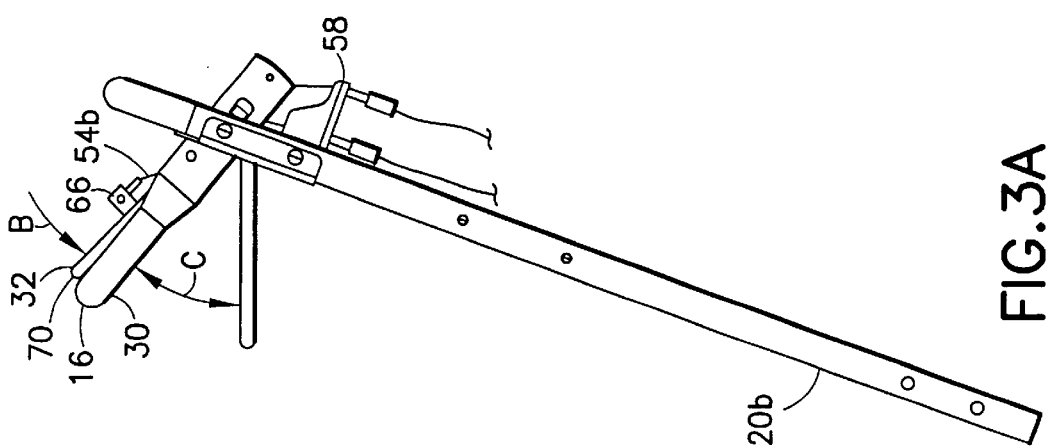
FIG. 3A is a side elevational view of the control system and handle shown in FIG. 2A at a first actuated or ON position.

Referring now also to FIGS. 3A and 3B, the handle member 20b and the user actuated control 16 are shown with the user actuated control moved to a first operable use or ON position. In this first position, a user has pushed forward on the operator presence member 32 to rotate the center section 70 of the operator presence member forward as shown by arrow B. The center section 70 has come to rest against the center section 30a. Because the mount 66 is moved with the operator presence member 32, the wire 54b is pulled. The guide 42 helps to guide the wire 54b while the mount 66 is moved through its arced path. Because the wire 54b is pulled rearward out of the rear end of the sheath, the front end of the wire 54b is also pulled rearward; into the sheath 52. This can actuate a switch or other suitable mechanism in the operator presence safety system to an ON position to allow the user to fully use the lawnmower 10 (i.e.: disengaging a flywheel brake).

In this first operable use position, the speed control member 30 has not yet been moved from its deactuated or neutral position. The transmission 26 has a neutral position when the speed control member 30 is at its deactuated position. In the neutral position, driving force from the motor 24 is not transmitted to the drive wheel(s) 22d. The speed control member 30 can be moved forward to pull on the wire 54a and move the transmission 26 from its neutral position to a driving position.

Referring also to FIGS. 4A and 4B, the user actuated control 16 is shown at a second operable use or ON position. In this second position, a user has pushed forward on both the operator presence member 32 and the speed control member 30 to rotate both the center sections 30a and 70 forward and downward as shown by arrow B. This second position is a fully actuated position for both the members 30, 32. The two members 30, 32 are now both projecting in a generally straight forward direction. However, in alternate embodiments, the two members 30, 32 could be angled slightly upward or downward. The speed control member 30 has been moved against the grab handle 68. This allows the user to grab the three members 30, 32 and 68 with a single hand. However, in a preferred embodiment, the speed control member 30 would only be moved to the maximum forward position when the lawnmower and user are climbing up a steep slope at a fast speed. However, any suitable speed relative to the position of the control member 30 could be provided.

When the center section 30a of the speed control member 30 is pivoted forward, the end 47 is pivoted upward and rearward. This causes the wire 54a to be pulled outward from its sheath 52. As noted above, the front end of the wire 54a is connected to the transmission 26. When the wire 54a is pulled by the speed control member 30, this actuates the transmission 26 to connect the driving force from the motor 24 to the drive wheels 22d. At the fully actuated second operable use position shown in FIGS. 4A and 4B, the transmission 26 is moved to its fully actuated position. Thus, the drive wheel 22d is fully engaged with the motor 24 by the transmission 26. The lawnmower 10 can than moved along the terrain at its full speed.

In a preferred embodiment, the transmission 26 is a variable speed transmission. The percentage or amount of driving force transmitted from the motor 24 to the drive wheels 22d is dependent upon the position of the wire 54a. Thus, the rotational speed of the drive wheels 22d can vary from neutral to full speed, depending upon the angular position of the speed control member 30, as the speed control member 30 is rotated through angle C (See FIG. 3A) from its neutral position shown in FIG. 3A to its full speed position shown in FIG. 4A. The speed of the lawnmower 10 on the terrain can, thus, be controlled by the angular position of the speed control member 30 relative to the handle 20.

If the speed of the lawnmower 10 is too fast for the walking speed of the user, because the user is grasping the speed control member 30 in order to comfortably actuate the operator presence member 32, the center section 30a of the speed control member 30 will rotate upward and backward as the handle 20 starts to move away from the user. Thus, the control 16 can automatically adjust or lower the speed of the lawnmower 10 when the walking speed of the user is less than the speed of the lawnmower on the terrain. This can happen without any conscious effort or thought having to be used by the user.

The control 16 can also automatically increase the speed of the lawnmower 10 when the user desires a faster speed by the user merely pushing forward on the speed control member 30. This forward pushing motion or force causes the top end of the speed control member 30 to rotate forward. As the member 30 rotates forward, the speed of the drive wheels 22d increases.

The control 16 of the present invention increases the speed of the lawnmower as the gap or angle between the fixed grab handle 68 and the speed control member 30 is reduced. Thus, the control 16 increases the speed of the wheels 22d as the gap between the center rear section 21 of the handle member 20b and the speed control member 30 increases. Likewise, the control 16 decreases the speed of the lawnmower as the gap or angle between the fixed grip handle 68 and the speed control member 30 is increased and when the gap between the rear center section 21 of the handle member 20b and the speed control member 30 decreases.

During turning of the lawnmower this allows the operator's hands (one located on the traction control handle 30 and one located on the center rear section 21 of the handle member 20b) to be located further apart for increased torque in turning the lawnmower. In addition, for a lawnmower, such as the lawnmower 10, which has front wheels that only rotate along one axis of rotation (i.e. are not on casters), the front wheels 22 need to be lifted off of the ground during turning. In order to do this, the user pressed down on the rear section 21 to pivot the front wheels upward.

Because the user can press down on the rear section 21 of the handle 20 rather than pressing down on the user actuated control to lift the front end of the lawnmower, the speed of the traction control system does not automatically vary as the rear end of the handle is pressed downward. One hand can adjust the control 16 independently of the other hand pressing down on the rear section 21. This overcomes a problem in the prior art, such as in the lawnmower described in U.S. Pat. No. 6,082,083 where, in order to lift the front wheels of the lawnmower up for turning, the user must press down on the movable grip handle which automatically increases the speed of the lawn mower; requiring the user to pull back on the movable grip handle to decrease the speed.

The present invention does away with this problem by allowing the rear of the handle 20 to be pressed downward by one of the user's hands for turning the lawnmower without the user automatically pressing down on the control 16. In fact, during turning of the lawnmower, the user could release the control 16 slightly with one hand (to reduce the speed of the lawnmower) while pressing down on the rear of the handle with the other hand. This greatly increases control over the lawnmower by the user.

In the present invention, the traction control is not merely a digital type of ON/OFF control. Instead, the traction control of the present invention is a variable control. The speed of the traction control system is varied depending upon the angular position of the control bail 30 relative to the stationary handle member 20b. However, in an alternate embodiment, features of the present invention could be used in a non-variable type of ON/OFF traction control system.

In this embodiment, the operator presence member 32 has been sized, shaped and orientated relative to the speed control member 30 such that the operator presence member 32 can stay with the speed control member 30 as the speed control member 30 is moved from its deactuated position to its fully actuated position. As can be seen in comparing FIG. 3A to FIG. 4A, the operator presence member 32 does not move relative to the speed control member 30 between these two positions. The mount 66 moves relative to the bracket 58, but the guide 42 provides a guiding path for the wire 54b. The operator presence system remains actuated between the first and second positions shown in FIGS. 3A and 4A.

Figure 5B:
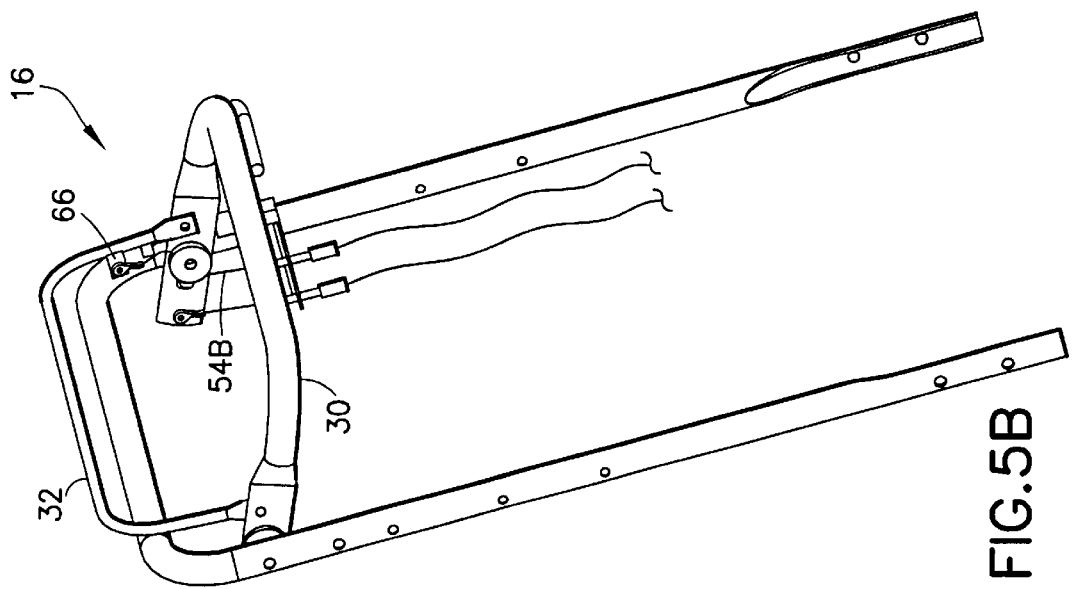
FIG. 5B is a perspective view of the control system and handle shown in FIG. 5A.
Figure 5A:
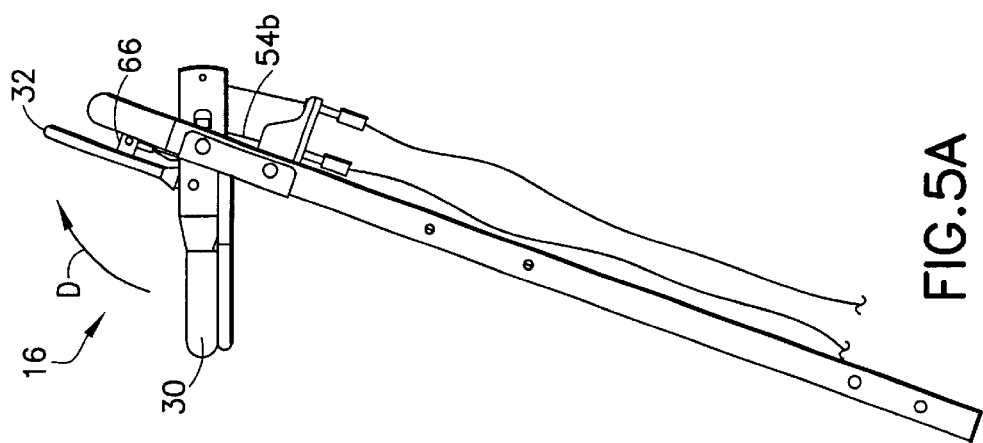
FIG. 5A is a side elevational view of the control system and handle shown in FIG. 2A at a second deactuated or OFF position.

Referring also to FIGS. 5A and 5B, the user actuated control 16 is shown at another position. This position corresponds to a situation when the speed control member 30 has been moved to its fully actuated position, but the user has released the operator presence member 32. Even though the speed control member 30 is at its full speed position, when the user releases the operator presence member 32 the wire 54b pulls on the mount 66. This force causes the operator presence member 32 to rotate upward and rearward, as shown by arrow D, back to its deactuated of OFF position. The wire 54b, thus, returns to its deactuated or OFF position, and the operator presence system returns to its OFF position to turn the motor 24 OFF such as stopping a spark to a sparkplug of the engine, and/or actuates a brake on a flywheel of the engine 24, or disengages the transmission between the motor 24 and the cutting blade 28, and/or stops the drive wheel 22d from rotating, such as applying a brake. However, any suitable type of operator presence system could be provided. Even though the speed control member 30 is at its full speed position, the drive wheels 22d will not move the lawnmower 10 forward.

The speed control device of the present invention works by the operator or user walking at his or her individual pace and pushing against the moveable handle 30, 32. This, in turn, engages the traction drive proportionally to how fast the operator walks. The present invention provides a pivoting bail system (30, 32) that rotates for and aft. This can allow for one hand to move the bail while another hand is placed on the main handle 20 so turning is easier. The present invention also can make use of a hand grip/stabilizer grip 68 on the left hand and/or right hand side to help stabilize control of the lawnmower and control 16 on rough ground. The ability to use one hand on the traction control bail 30 and one hand on the stationary handle 20 allows easier turning and also stabilizes the speed better. To back up the user can pull on the traction control bail 30 or, on the bail 30 and the handle 20. The present invention allows the user more options in grasping the handle 20 and control 16 and, therefore, better control for a wider population of users. Frictional resistance to movement of the traction control bail 30 has also been added to keep the control bail from moving too easily.

Referring now to FIGS. 6A–6C, and alternate embodiment of the present invention is shown. In this embodiment, the user actuated control 80 generally comprises a speed control member 82, an operator presence member 84, and two links 86, 88. The speed control member 82 generally comprises a U-shaped member 90, and two side mounting brackets 92, 94. The U-shaped member 90 generally comprises two legs 96, 98 and a center section 100. The side mounting brackets 92, 94 are fixedly attached to the U-shaped member 90 at the junction or bends between the center section 100 and the two legs 96, 98.

The side mounting brackets 92, 94 are pivotably connected to the handle member 20b. The side bracket 92 projects downward and rearward from the U-shaped member 90. A wire or cable 102 of the link 86 is attached to the end of the bracket 92. A friction pack 104 is provided between the bracket 94 and the handle 20b.

The operator presence member 84 generally comprises a U-shaped member 106 and a mount 108. The U-shaped member 106 generally comprises a center section 110 and two legs 112, 114. The center section 110 is rotatably connected to the center section 100 by brackets 116. However, in alternate embodiments, any suitable system could be used to movably mount the two members 106, 90 to each other. The mount 108 is connected to a wire or cable of the link 88. The wire extends through a guide bracket 118 on the mount 92. The handle member 20b includes stationary grip handles 120 on right and left sides of the handle. The grip handles 120 extend in a generally straight forward direction.

Figure 7C:
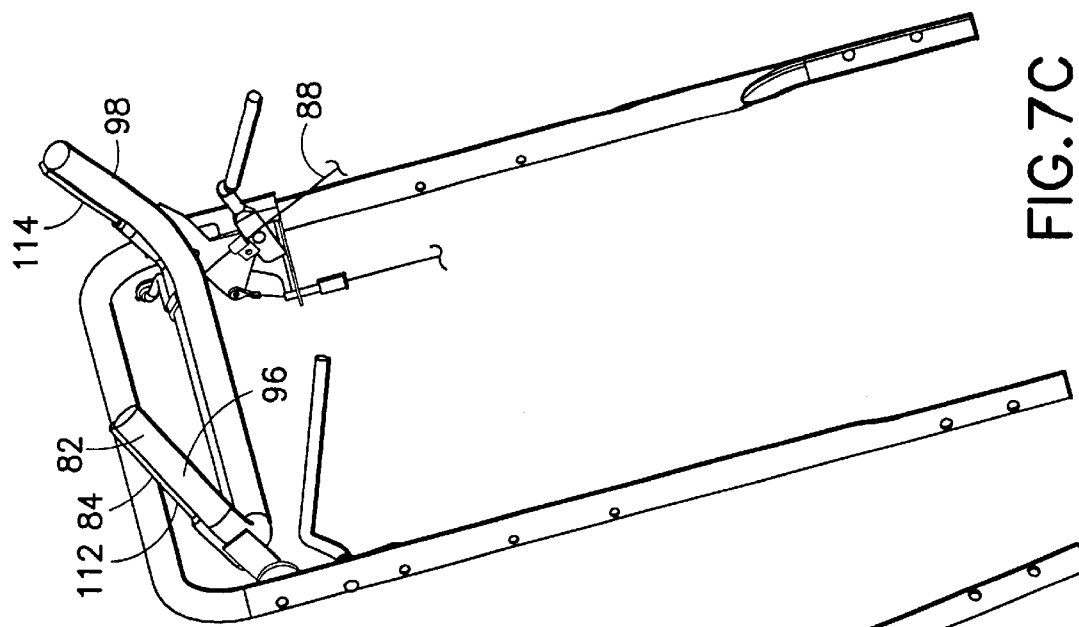
FIGS. 7A–7C are side elevational and perspective views of the handle and control system shown in FIGS. 6A–6C at a first actuated or ON position.
Figure 7B:
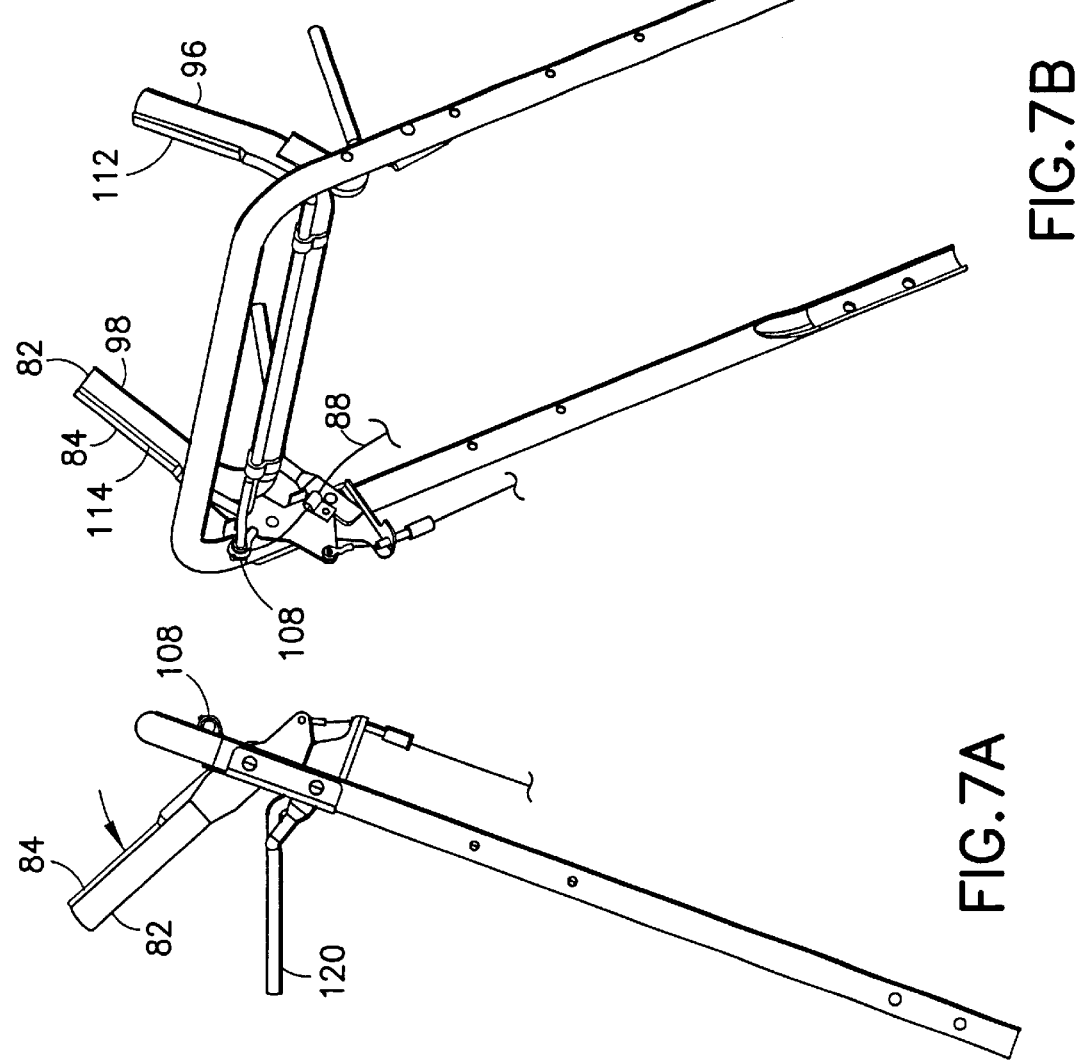
Figure 7A:
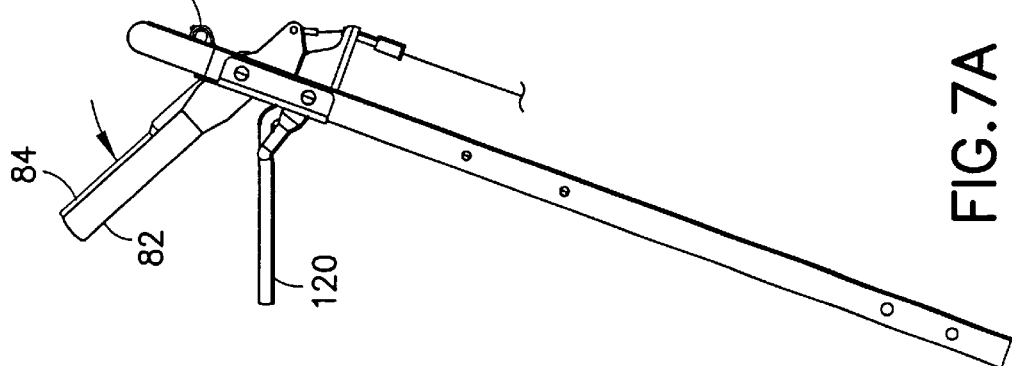

FIGS. 6A–6C show the user actuated control 80 at a fully deactuated position similar to that shown in FIGS. 2A–2B. However, in this embodiment, the legs of the speed control member 82 and operator presence member 84 extend in general upward and forward directions. The legs 96, 98, 112, 114 also extend in inward directions towards each other. Referring now also to FIGS. 7A–7C, the control 80 is shown at a first user actuated or ON position. This is similar to the first user actuated position shown in FIGS. 3A and 3B. In this position, the operator presence member 84 has been rotated on the speed control member 82 in a forward direction. The legs 112, 114 now rest against the backside of the legs 96, 98. The wire in the link 88 has been moved rearward and upward by the mount 108. Thus, the operator presence system at the motor can be moved to a disengaged or OFF position. The speed control member 82 is located at a deactuated position such that the transmission on the engine is located at a neutral position. This position is normally used when starting the lawnmower, or when moving the lawnmower with the transmission in neutral.

Referring now also to FIGS. 8A–8C, the control 80 is shown at a second user actuated position. This position is similar to the position of the embodiment shown in FIGS. 4A and 4B. In this second position, a user has pushed forward on both the operator presence member 84 and the speed control member 82 to axially rotate both the center sections 100 and 110, and push the legs 96, 98, 112 and 114 forward and downward as shown by arrow B. This second position is a fully actuated full speed position for both the speed control member 82. The two members 82, 84 are now both projecting in a generally straight forward direction. However, in alternate embodiments, the two members 82, 84 could be angled slightly upward or downward. The speed control member 82 has been moved against the grab handles 120. This allows the user to grab the three members 82, 84 and 120 with a single hand or both hands. However, in a preferred embodiment, the speed control member 82 would only be moved to the maximum forward position when the lawnmower and user are climbing up a steep slope at a fast speed. However, any suitable speed relative to the position of the control member 82 could be provided.

When the center section 100 of the speed control member 82 is rotated in a forward direction, the bracket 92 is pivoted upward and rearward. This causes the rear end of the wire 102 to be pulled upward and rearward. As noted above, the front end of the wire 102 is connected to the transmission. When the wire 102 is pulled by the speed control member 82, this actuates the transmission to connect the driving force from the motor to the drive wheels. At the full speed position shown in FIGS. 8A–8C, the transmission is moved to its fully actuated position. Thus, the drive wheels are fully engaged with the motor by the transmission. The lawnmower can than moved along the terrain at its full speed.

Figure 9C:
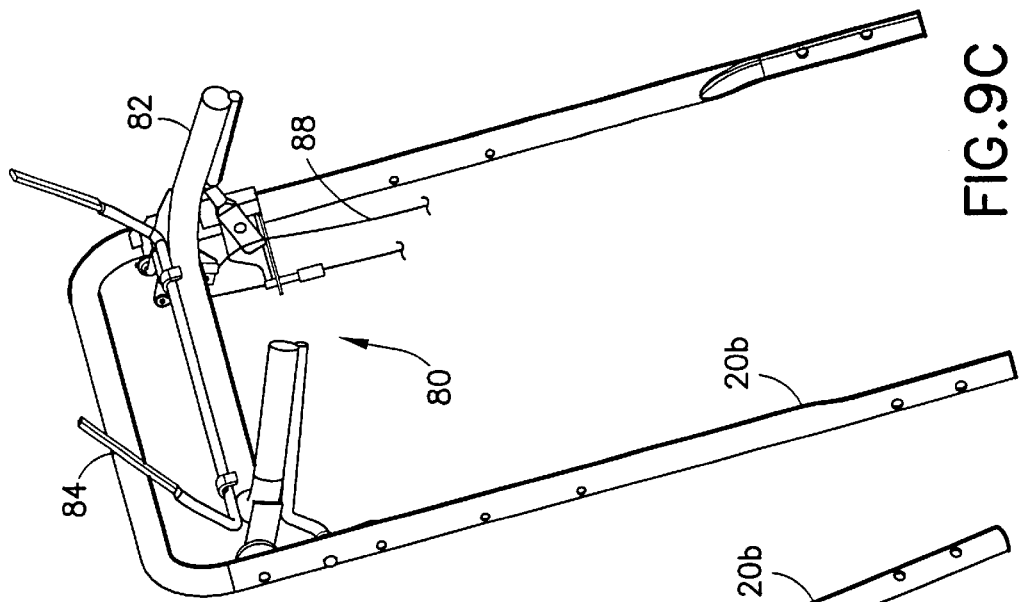
FIGS. 9A–9C are side elevational and perspective views of the handle and control system shown in FIGS. 6A–6C at a second deactuated or OFF position.
Figure 9B:
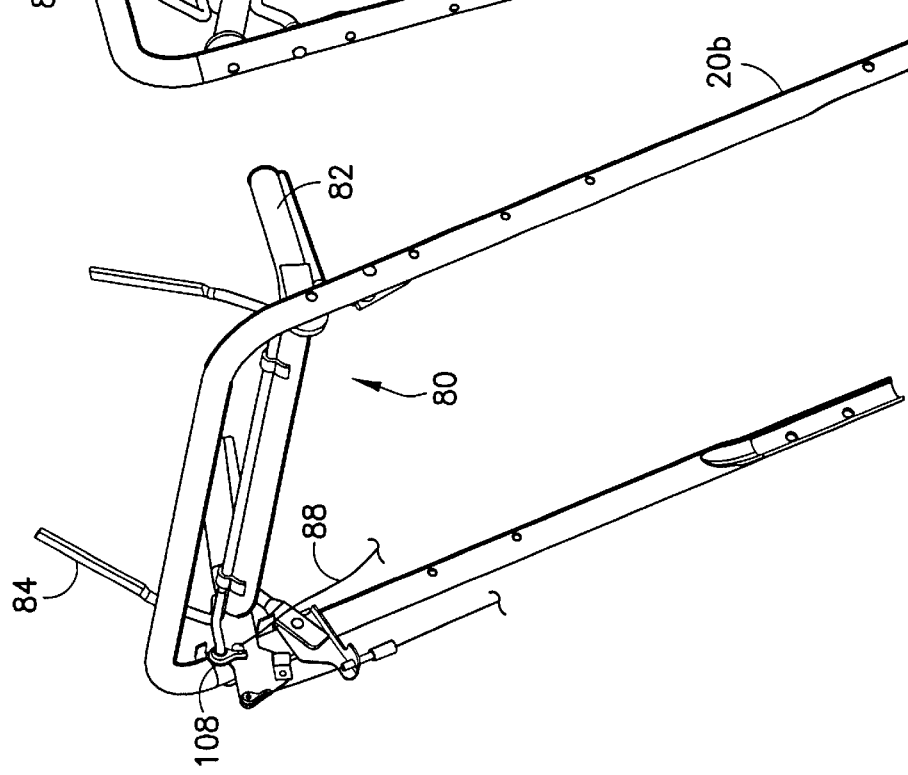
Figure 9A:
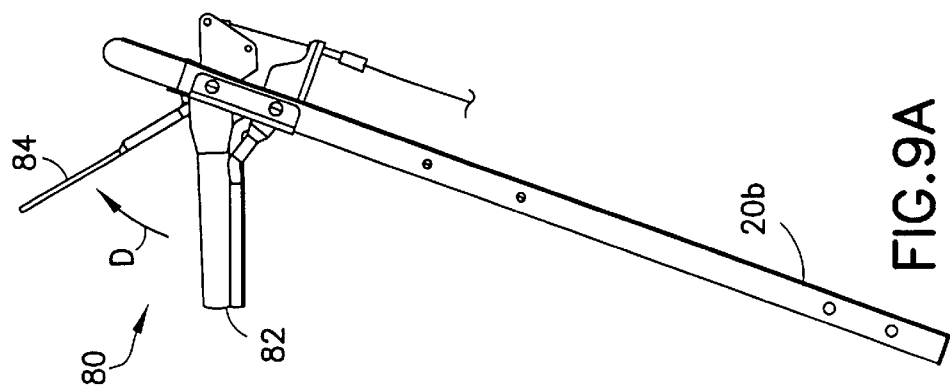

In this embodiment, the operator presence member 84 has been sized, shaped and orientated relative to the speed control member 82 such that the operator presence member 84 can stay with the speed control member 82 as the speed control member 82 is moved from its deactuated position to its fully actuated position. As can be seen in comparing FIG. 7A to FIG. 8A, the operator presence member 84 does not move relative to the speed control member 82 between these two positions. The operator presence system remains actuated between the first and second positions shown in FIGS. 7A and 8A Referring also to FIGS. 9A–9C, the user actuated control 80 is shown at another position. This position corresponds to a situation when the speed control member 82 has been moved to its fully actuated position, but the user has released the operator presence member 84. Even though the speed control member 82 is at its full speed position, when the user releases the operator presence member 84 the wire 88 pulls on the mount 108. This force causes the operator presence member 84 to rotate upward and rearward, as shown by arrow D, back to its deactuated position. The wire 88, thus, returns to its deactuated position, and the operator presence system is turned to an OFF position to turn the motor OFF, such as stopping a spark to a sparkplug of the engine and/or actuates a brake on a flywheel of the engine, and/or disengages the transmission between the motor and the cutting blade, and/or stops the drive wheel from rotating, such as by applying a brake. However, any suitable type of operator presence system could be provided. Even though the speed control member 82 is at its full speed position, the drive wheel will not move the lawnmower forward.

Referring now to FIGS. 10–13, an alternate embodiment of the present invention will be described. The handle assembly 130 generally comprises a frame 132, a speed control member 134 and an operator presence member 136. The frame 132 includes a general U shaped bar member 138 and a cover 140. The U shaped bar member 138 is preferably comprised of metal and is attached to the deck of the lawnmower. The cover 140 is preferably comprised of plastic and is attached to the rear end of the metal U shaped bar member 138. In alternate embodiments, any suitable materials could be used. The cover provides a cover on both sides of the handle assembly at two pivot locations; the pivot locations of the speed control member 134 on the metal bar 138 and the pivot locations of the operator presence member 136 on the speed control member 134. The cover also provides a space for feature or product identification or other indicia, such as a safety or warning sticker. In an alternate embodiment, the cover might not be provided.

The speed control member 134 generally comprises a U shaped structural member 142 with an overmolded plastic soft grip 144. The structural member 142 is preferably comprised of metal. The legs of the U shaped structural member 142 are pivotably attached to opposite sides of the bar member 138 at locations 146. Bottom sections 148 of the legs extend below the pivot location 146. The sections 148 comprise a pivot/cable attachment location 150 and one of the sections 148 has an arm 152 with an operator presence cable outer sheath attachment location 154. The front end of the grip 144 comprises a recess 156 for receiving a rearward portion of the operator presence member 136. In alternate embodiments, the speed control member could be comprised of any suitable material(s) and could have any suitable type of shape.

The operator presence member 136 has a general U shape. In this embodiment, the operator presence member 136 comprises a U shaped metal bar 158 and a plastic cover 160. In alternate embodiments the operator presence member could be comprised of any suitable shape or type of member (s) or material(s). The bottom of the legs of the bar 158 have bent sections 162 and ends 164 which are pivotably attached to the sections 148 at locations 150.

The lawn mower has an operator presence cable 166 with an outer sheath 168 and an inner wire 170. The rear end of the sheath 168 is attached to the location 154 of the speed control member 134. The rear end of the inner wire 170 is attached to the bar 158 of the operator presence member 136 by a connector 172. When the operator presence member 136 is pivoted relative to the speed control member 134, the wire 170 can be moved relative to the sheath 168.

The lawn mower also has a speed control cable 174 with an outer sheath 176 and an inner wire 178. The rear end of the sheath 176 is attached to the frame 132 by a mount 180. The rear end of the inner wire 178 is attached to the location 150 of the speed control member 134 by a connector 182. When the speed control member 134 is pivoted relative to the frame 132, the wire 178 can be moved relative to the sheath 176. Because the operator presence member 136 is connected to the speed control member 134, and the sheath 168 is connected to the speed control member 134, the wire 170 only moves relative to the its outer sheath 168 when the operator presence member 136 is moved relative to the speed control member 134.

Figure 10:
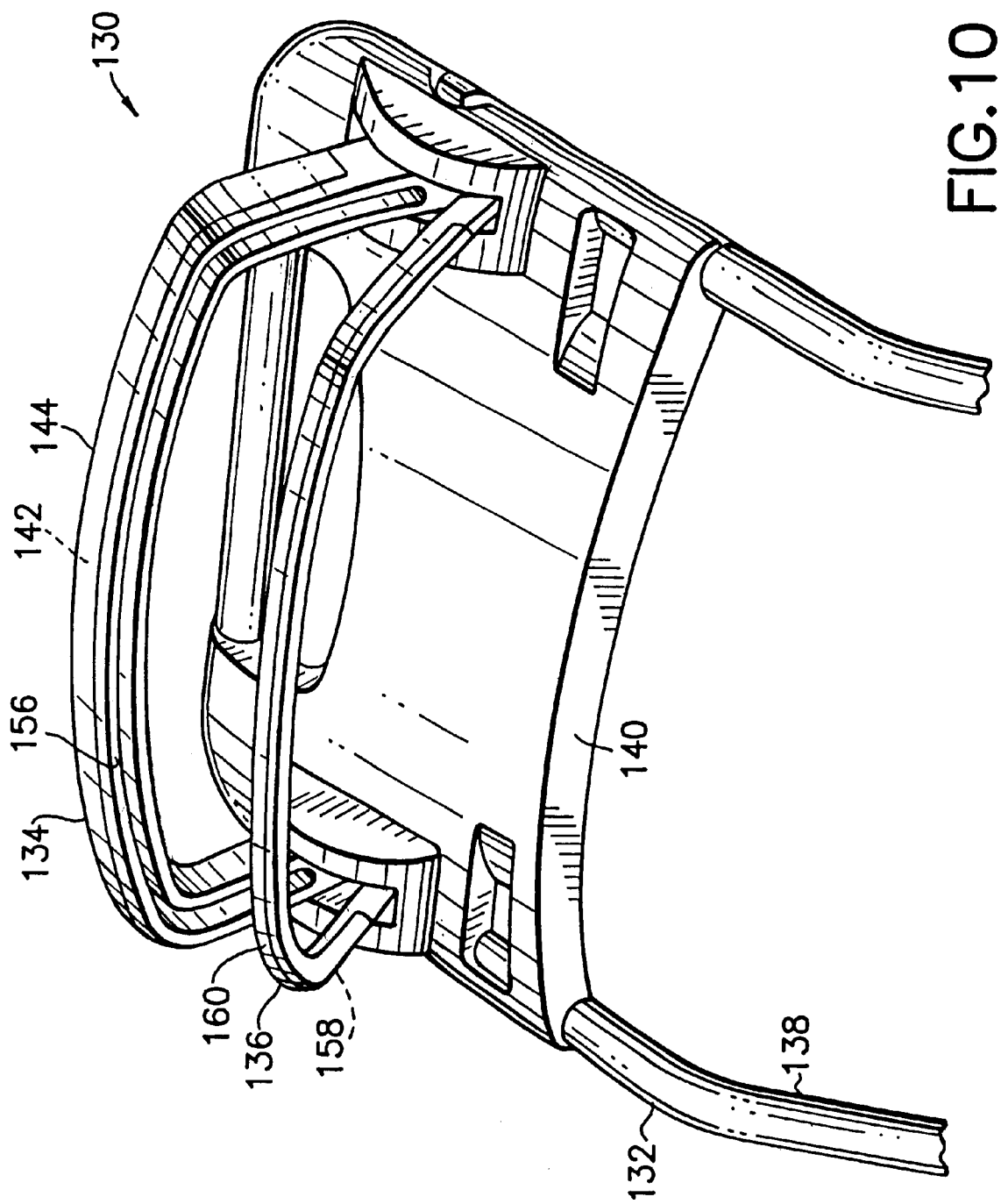
FIG. 10 is a perspective view of the rear end of an alternate embodiment of a handle assembly incorporating features of the present invention.
Figure 11:
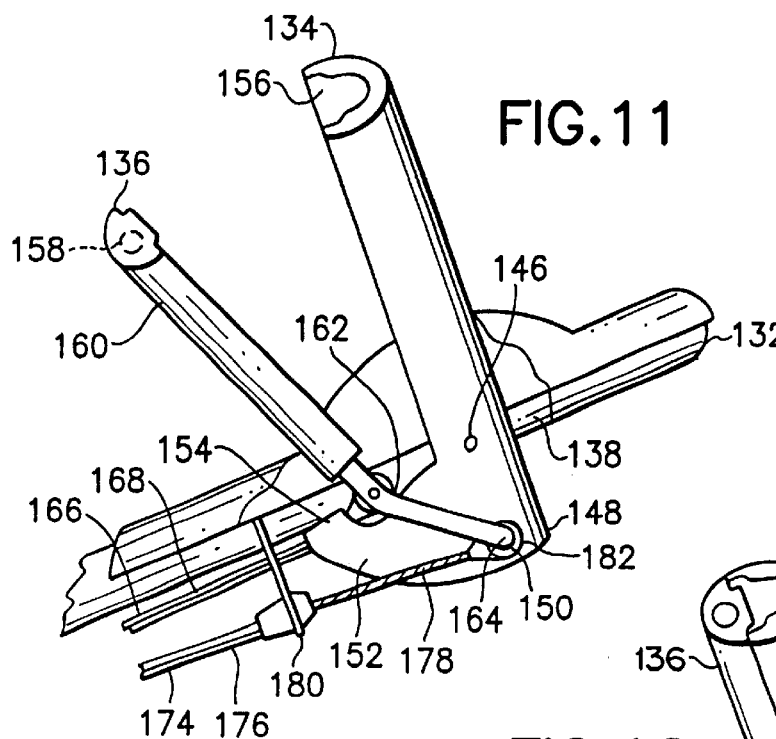
FIG. 11 is a side elevational view of the handle assembly shown in FIG. 10 with the operator presence member and the speed control member located at home positions.

FIGS. 10 and 11 show the handle assembly 130 at a home position. The operator presence member 136 is located forward relative to the speed control member 134 and the speed control member 134 is located at a rearward position on the frame 132. This home position is preferably obtained by a pulling or biasing force provided by the wires 170, 178.

Figure 12:
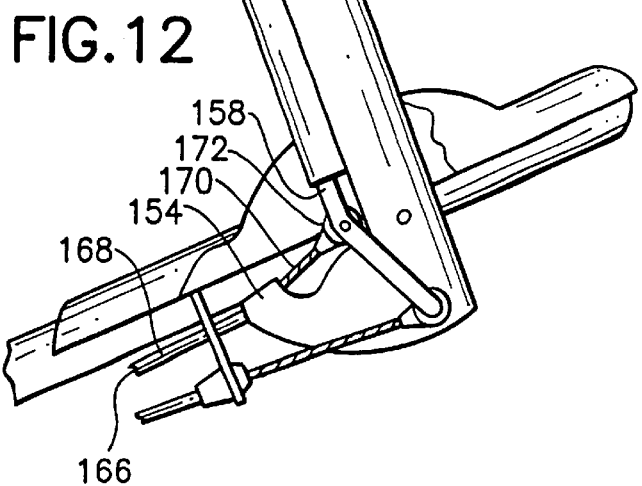
FIG. 12 is a side elevational view of the handle assembly similar to FIG. 11 with the operator presence member moved to an actuated position.

FIG. 12 shows the handle assembly 130 at an idle operational position. In the operational position shown, a user has moved the operator presence member 136 rearward against the front side of the speed control member 134. This disengages the motor brake attached to the opposite forward end of the cable 166.

Figure 13:
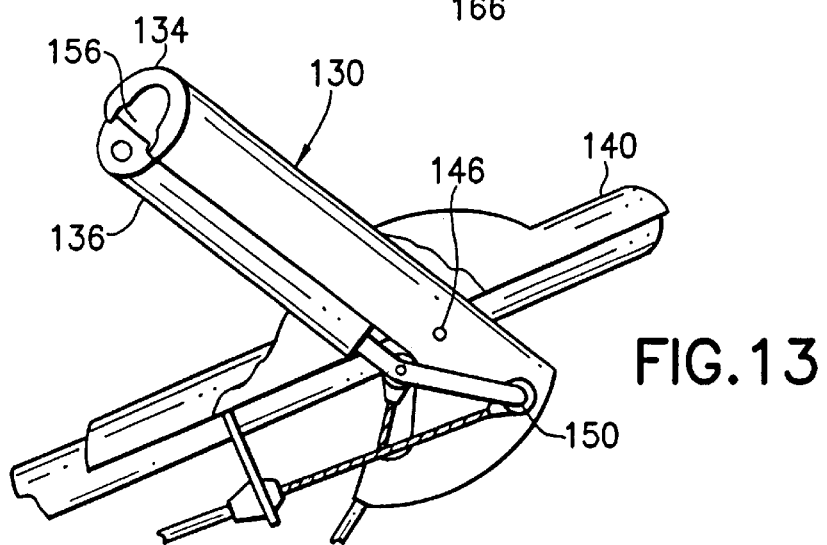
FIG. 13 is a side elevational view of the handle assembly similar to FIG. 12 with the speed control member moved to a forward position with the operator presence member being retained with the speed control member.

FIG. 13 shown the handle assembly 130 at a full speed operational position. In this position a user has moved the speed control member 134 and operator presence member 136 forward together as a unit. If the operator releases the operator presence member 136, it will spring forward, pivoting at the location 150, to allow the motor brake to engage and stopping the engine. The front end of the speed control member having the recess 156 and the rear end of the operator presence member 136 can interlock or nest to provide relatively large size handles, but which are comfortable to grip as a singular unit. The cover 140 can cover the pivot locations at 146 and 150.

This alternate embodiment illustrates that the operator presence member can be located in front of the speed control member. In alternate embodiments, any suitable members could be provided to provide an operator presence member located in front of a speed control member, but pivotably attached to the speed control member.

Although the present invention has been described with reference to only the three embodiments shown in the drawings, features of the present invention could be incorporated into other alternative embodiments. The present invention provides a rotating handle control and a variable speed transmission which combine to provide a more user friendly and automatic speed control which can automatically vary the speed of the power tool based upon the walking pace of the user and the angular position of the speed control bail. On rough ground, the upper portion of the handle 20 bounces up and down. With the present invention, the up and down motion of the upper portion of the handle 20 does not tend to rotate the traction control bail. Therefore, speed of the lawnmower along the terrain is easier to control than in conventional lawnmowers. One or more grab handles can be provided such that, when going uphill, more force can be applied directly to the handle 20 through the grab handle. In addition, on rough ground, the user can use the grab handle as extra support to control speed. A friction pack adds resistance so the traction control handle does not easily rotate when the upper portion of the stationary handle 20 move up and down along rough ground. The design of the present invention also allows more options to control speed and turning so there is less operator fatigue. When turning, an operator can put one hand on the traction control handle and one hand on the upper portion of the upper stationary handle 20 and control speed much better as the operator turns the lawnmower. The embodiment shown in FIGS. 6–9 can be more comfortable to a user because, when the user places his hands on the legs of the handles 82, 84, he does not twist his wrists.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A self-propelled power equipment unit comprising:
   a frame comprising a handle with a general U-shaped rear end;
   a drive located on the frame and connected to a drive wheel by a transmission; and
   a user actuated control connected to the transmission, the user actuated control comprising a speed control lever pivotably connected to the handle proximate the U-shaped rear end and an operator presence lever pivotably connected to the speed control lever wherein the speed control lever comprises a general U-shaped member with opposite legs of the U-shaped member directly pivotably connected to opposite sides of the handle.

2. A self-propelled power equipment unit as in claim 1 wherein the user actuated control comprises a link connected between an end of one of the legs and the transmission.

3. A self-propelled power equipment unit as in claim 2 wherein the link comprises a cable.

4. A self-propelled power equipment unit as in claim 1 wherein the legs extended in a general forward and upward direction.

5. A self-propelled power equipment unit as in claim 4 wherein the legs are connected to the handle at bends between the legs and a center connecting section of the U-shaped member.

6. A self-propelled power equipment unit as in claim 5 wherein the speed control lever further comprises an extension extending downwardly from the U-shaped member, and a link connected between the extension and the transmission.

7. A self-propelled power equipment unit as in claim 1 wherein the operator presence lever comprises a general U-shaped member.

8. A self-propelled power equipment unit as in claim 7 wherein ends of legs of the U-shaped member are directly pivotably attached to the speed control lever.

9. A self-propelled power equipment unit as in claim 7 wherein a center connecting section of the U-shaped member is directly pivotably attached to the speed control lever.

10. A self-propelled power equipment unit as in claim 7 wherein the speed control lever comprises a general U-shaped member, and wherein the U-shaped member of the operator presence lever is aligned in a same orientation as the U-shaped member of the speed control lever when the operator presence lever is actuated to an ON position.

11. A self-propelled power equipment unit as in claim 1 wherein the user actuated control is connected to the transmission by a link that is operable by pulling upon the link.

12. A self-propelled power equipment unit as in claim 1 wherein the user actuated control is connected to the transmission by a link that comprises a cable.

13. A self-propelled power equipment unit comprising:
   a frame comprising a handle with a general U-shaped rear end;
   a drive located on the frame and connected to a drive wheel by a transmission; and
   a user actuated control connected to the transmission, the user actuated control comprising a speed control lever pivotably connected to the handle proximate the U-shaped rear end and an operator presence lever pivotably connected to the speed control lever wherein the speed control lever comprises a general U-shaped member with opposite legs of the U-shaped member directly pivotably connected to opposite sides of the handle; with a friction pack directly between an outwardly facing side of one of the legs and an inwardly facing side of the handle.

14. A self-propelled power equipment unit comprising:

a frame comprising a handle with a general U-shaped rear end;

a drive located on the frame and connected to drive wheel by a transmission; and a user actuated control connected to the transmission, the user actuated control comprising a speed control lever pivotably connected to the handle proximate the U-shaped rear end and an operator presence lever pivotably connected to the speed control lever; wherein the user actuated control further cqmprises a cable connected to the operator presence lever and a guide on the speed control lever for the cable to guidingly wrap partially around.

15. A walk-behind self-propelled lawnmower comprising:

a frame comprising a handle;

a motor located on the frame;

wheels connected to the frame;

a transmission connecting the motor to one of the wheels; and a user actuated control comprising a speed control lever and a control link connected between the speed control lever and the transmission, wherein the speed control lever has a general U-shape with opposite side ends of the general U-shape each being pivotably connected to respective opposite sides of the handle, and wherein the control link is pulled by the speed control lever as a top of the lever is pivoted forward on the handle.

16. A walk-behind self-propelled lawnmower as in claim 15 wherein a first leg of the general U-shape speed control lever has a first end with the link connected thereto.

17. A walk-behind self-propelled lawnmower as in claim 16 wherein a middle section of the first leg is pivotably connected to the handle such that the end of the first leg moves in opposite unison relative to the top of the lever.

18. A walk-behind self-propelled lawnmower as in claim 17 wherein a second leg of the general U-shape speed control lever has a second end pivotably connected to the handle.

19. A walk-behind self-propelled lawnmower as in claim 15 wherein the user actuated control further comprises an operator presence lever pivotably attached to the speed control lever.

20. A walk-behind self-propelled lawnmower as in claim 19 wherein the operator presence lever comprises a U-shaped member which is aligned in a same orientation as the general U-shape speed control lever when the operator presence lever is actuated to an ON position.

21. A walk-behind self-propelled lawnmower as in claim 20 wherein legs of the U-shaped member of the operator presence lever are orientated in general upward and forward directions.

22. A walk-behind self-propelled lawnmower as in claim 15 wherein the general U-shape speed control lever comprises a center section and two leg sections extending from the center section, and wherein the center section is pivotably connected to the handle at junctions between the center section and the leg sections.

23. A walk-behind self-propelled lawnmower as in claim 15 wherein the handle comprises a main U-shaped member and a stationary grip handle extending in a forward direction from the main U-shaped member.

24. A walk-behind self-propelled lawnmower comprising:

a frame comprising a handle;

a motor located on the frame;

wheels connected to the frame;

a transmission connecting the motor to one of the wheels; and a user actuated control comprising a speed control lever and a control link connected between the speed control lever and the transmission, wherein the speed control lever has a general U-shape with opposite side ends of the general U-shape each being pivotably connected to respective opposite sides of the handle, and wherein the control link is pulled by the speed control lever as a top of the lever is pivoted forward on the handle; wherein the user actuated control further comprises a friction pack sandwiched between one of the side ends of the speed control lever and an inwardly facing surface of the handle.

25. A method of assembling a user actuated control for a walk-behind self propelled lawnmower, the method comprising steps of:

providing a lawnmower handle;

pivotably connecting a user actuated control to the handle, the user actuated control having a general U-shaped section with opposite ends of the U-shaped section being directly pivotably attached to respective opposite sides of the handle; and connecting a link between the user actuated control and a drive transmission of the mower, wherein the link is connected to the user actuated control such that the link is pulled by the user actuated control when a top end of the user actuated control is pivoted forward on the handle.

26. A walk-behind self-propelled lawnmower comprising:

a frame comprising a handle;

a motor located on the frame;

wheels connected to the frame;

a transmission connecting the motor to one of the wheels; and a user actuated control comprising a speed control lever and a control link connected between the speed control lever and the transmission, wherein the speed control lever has a general U-shape with opposite side ends of the general U-shape each being pivotably connected to respective opposite sides of the handle, and wherein the control link is pulled by the speed control lever as a top of the lever is pivoted forward on the handle; wherein a first leg of the general U-shape speed control lever has a first end with the link connected thereto; wherein a middle section of the first leg is pivotably connected to the handle such that the end of the first leg moves in opposite unison relative to the top of the lever; and, wherein the user actuated control further comprises an operator presence lever, a cable attached to the operator presence lever, and a cable guide attached to the speed control lever, wherein the cable is located in a groove of the cable guide.

* * * * *